United States Patent [19]
John et al.

[11] Patent Number: 5,475,579
[45] Date of Patent: Dec. 12, 1995

[54] PULSE WIDTH MODULATOR FOR SWITCHING POWER SUPPLY

[75] Inventors: Paul John, Hazlet; Walter G. Kutzavitch, Freehold, both of N.J.

[73] Assignee: AT&T Corp., Murray Hill, N.J.

[21] Appl. No.: 169,250

[22] Filed: Dec. 20, 1993

[51] Int. Cl.⁶ .................................................. H02M 3/335
[52] U.S. Cl. .................................................. 363/21; 323/902
[58] Field of Search .................................. 363/18, 19, 20, 363/21, 56, 97, 132; 323/902

[56] References Cited

U.S. PATENT DOCUMENTS

| | | | |
|---|---|---|---|
| 4,378,585 | 3/1983 | Bete | 363/19 |
| 4,761,724 | 8/1988 | Brown et al. | 363/21 |
| 4,962,292 | 10/1990 | Aoki | 323/902 X |
| 5,063,489 | 11/1991 | Inaba | 363/21 |
| 5,063,491 | 11/1991 | Shigeo | 363/56 |
| 5,146,386 | 9/1992 | Learned | 361/91 |
| 5,184,290 | 2/1993 | Ozawa et al. | 363/21 |

OTHER PUBLICATIONS

Wide Range Uniformly High Efficiency DC–DL Converter, W. C. Singleton, IBM Technical Disclosure, vol. 15 No. 4 Sep. 1972 pp. 1359 & 1360.
K. H. Billings, Switch Mode Power Supply Handbook, McGraw–Hill, 1989, Chapter 1, pp. 2.3–2.15.

Primary Examiner—Peter S. Wong
Assistant Examiner—Adolf Berhane
Attorney, Agent, or Firm—John A. Caccuro

[57] ABSTRACT

An improved pulse width modulation type switching power supply uses an opto-isolator as an output voltage error amplifier which feeds back an error signal to control pulse width modulation as well as to provide isolation between the primary and secondary voltages of the power supply.

6 Claims, 3 Drawing Sheets

PULSE WIDTH MODULATOR FOR SWITCHING POWER SUPPLY

TECHNICAL FIELD

This invention relates to switching power supplies that utilize pulse width modulators.

BACKGROUND OF THE INVENTION

Switching power supplies utilize a pulse width modulator to change the pulse width of the switching voltage to provide appropriate power to the output. Usually a pulse width modulator (PWM) integrated circuit (IC) is used for this purpose. However, additional discrete components are needed to make the PWM IC work properly.

FIG. 1 shows a typical switching power supply implementation (see Billings, K. H., *Switch Mode Power Supply Handbook*, McGraw-Hill, 1989, in Chapter 1, pages 2.3–2.15.) FIG. 1 shows the switching power supply being used in an off-line AC to DC switching power supply arrangement. To isolate the high voltages at the primary from the lower DC voltages at the secondary, a transformer (T10) and an opto-isolator (U10) are used. Opto-isolator U10 also feeds an error signal to the PWM (IC10). This error signal adjusts the pulse width of PWM IC10 to ensure that the switching power supply provides adequate power to the output terminals. Error amplifier IC11 generates the error signal by comparing the output voltage with the voltage reference provided by zener diode CR11.

Undesirably, the switching power supply circuit of FIG. 1 uses too many components to accomplish pulse width modulation. These extra components increase both the cost and power usage of the circuit. Additionally, extra components increase the area utilized on the printed wiring board needed to implement the circuit.

SUMMARY OF THE INVENTION

The invention provides an improved pulse width modulation (PWM) type switching power supply which uses an opto-isolator as the error amplifier to control pulse width modulation as well as to provide isolation between the input and output voltages of the power supply. More particularly, the switching power supply is connected as an off-line AC to DC power supply having its output terminals DC isolated from its input terminals. An oscillator and drive circuit connects to a rectified AC voltage source and the opto-isolator controls the pulse width of a switching voltage. The opto-isolator device also acts as an error amplifier. The opto-isolator device includes an input diode optically coupled to the base of an output transistor. The input diode is connected in series with a zener diode across the power supply output terminals. The emitter and collector of the output transistor are connected to control the pulse width of the oscillator circuit in response to changes in current through the input diode. A resistor connects between the base of the output transistor of the opto-isolator device and the source terminal of the switching field-effect transistor (FET) so that the resulting base current biases the output transistor in a linear operating region.

DETAILED DESCRIPTION

Figure 1:
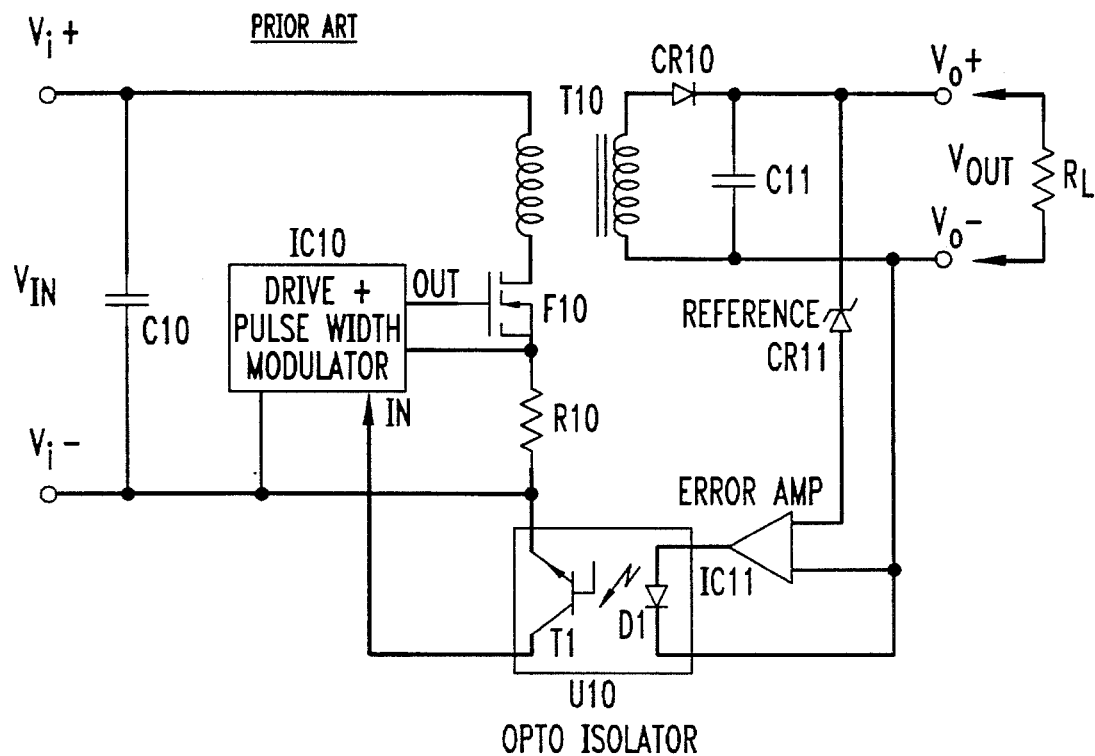
FIG. 1 is a block and circuit diagram implementation of a conventional pulse width modulator type switching power supply connected as an off-line AC to DC power supply.

With reference to FIG. 1, we describe the operation of the previously referenced prior art switching power supplies. A rectified AC voltage $V_{in}$ is received at the input terminals ($V_{i+}$) and ($V_{i-}$). This input voltage is filtered by capacitor C10. Pulse width modulator and drive circuit IC10 provides a switching voltage to field effect transistor F10. When transistor F10 turns ON, current flow through the primary of transformer T10 couples power to the secondary of transformer T10. The output voltage at the secondary of transformer T10 is rectified by diode CR10 and filtered by capacitor C11 to form the output DC voltage $V_{out}$ ($V_{o+}$ and $V_{o-}$). This output DC voltage is provided to load impedance RL. A feedback circuit is provided by zener diode CR11, error amplifier IC11, and opto-isolator U10. This feedback circuitry controls the pulse width and frequency of pulse width modulator IC10.

In switching circuits, especially in switching power supplies, the pulse width modulator (PWM) IC10 is used to change both the operating frequency and duty cycle of the switching voltage to provide adequate output power to load impedance RL. When the switching power supply is used in an off-line AC to DC power supply arrangement, opto-isolator U10 is used for isolating the high primary input rectified AC voltage from the secondary DC output voltage. A feedback signal, generated by error amplifier IC11, is sent to PWM IC10 via opto-isolator U10. The IC10 is used to control the pulse width modulation and U20 is used to isolate the primary and secondary voltages.

The error amplifier IC11, present at the output of the switching power supply, compares the voltage appearing at its two input terminals. When the output voltage $V_{out}$ exceeds the voltage of zener diode CR11 plus the turn-on voltage of error amplifier IC11, current flows in the light-emitting diode D1 of opto-isolator U10. When the output voltage $V_{out}$ is not sufficient to turn on the error amplifier IC11, no current flows through diode D1 of opto-isolator U10.

When the current flow through diode D1 generates sufficient photon flow, it will provide the base current needed to operate transistor T1 of opto-isolator U10. When this happens, transistor T1 turns ON and sends a feedback signal to PWM IC10 to change the pulse width and frequency of the switching wave form.

Figure 2:
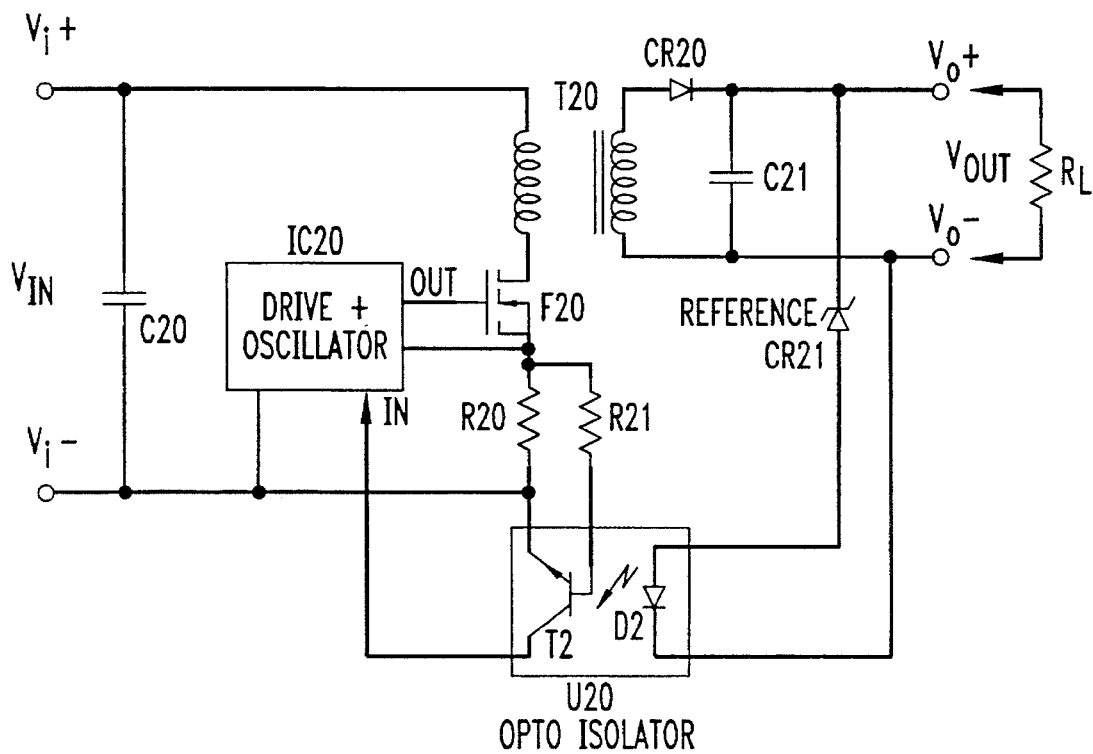
FIG. 2 is a block and circuit diagram implementation of the pulse width modulator type switching power supply of FIG. 1 implemented in accordance with the invention.

With reference to FIG. 2, we describe in detail the operation of the present invention. In accordance with the invention, the opto-isolator U20 is used to provide the function of the error amplifier IC11 of FIG. 1. Additionally, an oscillator IC20 is used to replace the pulse width modulator IC10 of FIG. 1. The invention saves cost since the PWM IC10 and error amplifier IC11 of FIG. 1, along with the discrete components used to make these integrated circuits operational, are no longer needed. This also eliminates the area on the printed wiring board used to mount these ICs and components. Additionally, it saves the power utilized by error amplifier IC11 and PWM IC10.

The operation of the invention shown in FIG. 2 is described as follows: Zener diode CR21 turns ON once the output voltage $V_{out}$ has exceeded the sum of the zener voltage and the turn-on voltage of diode D2 of opto-isolator U20. This induces current flow through transistor T2 of opto-isolator U20 which reduces the operating frequency and pulse width of oscillator IC20, thereby providing less power at the output terminals. If transistor T2 is not ON, the oscillator IC20 operates at its maximum frequency and pulse width to provide maximum power to the output load RL. When oscillator IC20 turns ON, field effect transistor (FET) F20 turns ON, causing current through FET F20 to start increasing, which increases the voltage across resistor R20. This voltage increase across resistor R20 adds to the voltage across R21 and slowly turns ON transistor T2 of U20, which in turn shortens the pulse width and thus slows the operating frequency of oscillator IC20. Thus, the maximum current flowing through FET F20 is limited by the transistor T2 of U20. The sum of the voltage across R21 and the voltage across R20 together control transistor T2 of U20 to change the frequency and pulse width of oscillator IC20.

For example, when the output load RL is drawing maximum current, the output voltage $V_{out}$ decreases and zener CR21 turns OFF. Hence, diode D2 no longer provides a photonic bias current to transistor T2 of U20. At this point, the frequency and pulse width of oscillator IC20 is increased since transistor T2 of U20 only turns ON in response to the current through FET F20. This is because transistor T2 of U20 is controlled only by the current flow through resistor R20. Consequently, the output voltage $V_{out}$ increases.

Conversely, when the output load decreases (RL increases), the output voltage $V_{out}$ increases, causing zener CR21 to turn ON. At this point, both the photonic feedback current from diode D2 and the current through resistor R20 act to turn ON transistor T2 earlier in each cycle, thereby causing the frequency and pulse width of oscillator IC20 to be reduced. Consequently, the output voltage $V_{out}$ decreases. Thus, the switching power supply is constantly adjusting the pulse width and frequency of oscillator IC20, and hence the output voltage $V_{out}$, to accommodate for changes in the output load RL.

Figure 3:
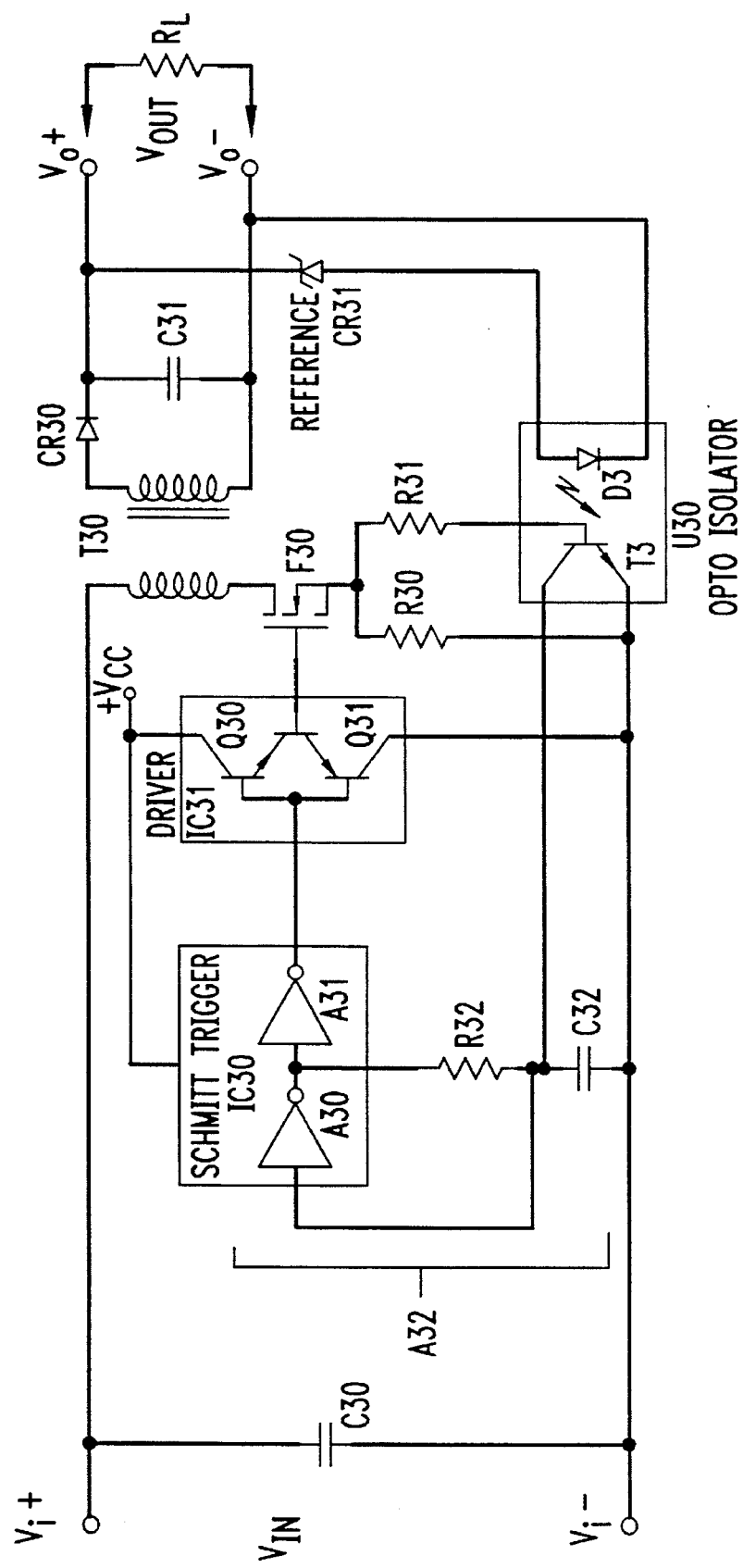
FIG. 3 is a circuit diagram of one implementation of the switching power supply circuit of FIG. 2 in accordance with the invention.

Shown in FIG. 3 is an illustrative circuit implementation of FIG. 2. A Schmitt trigger chip IC30 includes a first Schmitt trigger circuit A30, which is connected as an oscillator, and a second Schmitt trigger circuit A31, which is connected as an inverter circuit. A driver circuit IC31 consists of two transistors Q30 and Q31 which connect to the output of circuit A31 and are used to drive transistor F30. The supply voltage V cc provides power to IC30 and IC31. Resistor R32 and capacitor C32 connect to Schmitt trigger circuit A30 to form an oscillator circuit A32. Resistor R32 and capacitor C32 determine the free-running frequency of oscillator circuit A32. The free-running frequency is the maximum frequency at which transistor F30 can be switched. The oscillator A32 has its maximum pulse width when it is operating at its free-running frequency. When the oscillator A32 is free-running, transistor T3 of opto-isolator U30 is OFF. When oscillator A32 is free-running, the increased frequency and pulse width enables the switching power supply to handle its maximum load RL.

Shown in FIG. 4 are illustrative voltage wave forms appearing across capacitor C32 ($V_{C32}$) and at the output of buffer circuit A31 ($V_{oA31}$) for a predetermined output load RL. At time $t_1$, the voltage $V_{C32}$ shows that capacitor C32 starts charging through resistor R32. At time $t_2$, the Schmitt trigger circuit A30 turns OFF and starts to discharge capacitor C32. At time $t_3$, the voltage $V_{C32}$ has decreased to the turn-ON voltage of Schmitt trigger circuit A30 and capacitor C32 again starts to charge. The longer the pulse width $t_3-t_2$, the greater the power provided to output load RL. The frequency of operation is the reciprocal of the time period $t_3-t_1$.

Figure 4A:
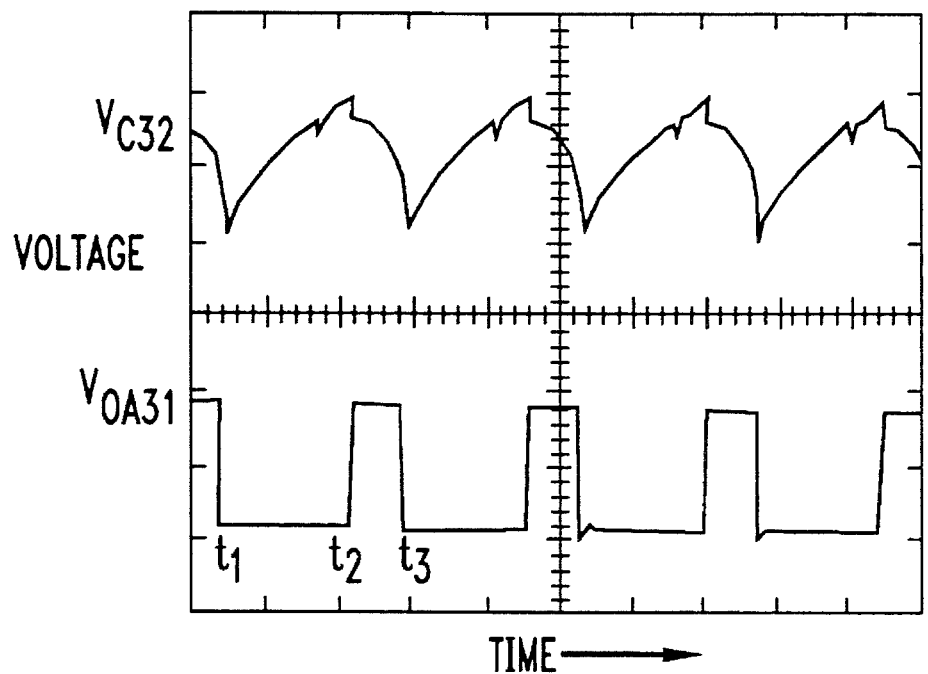
FIG. 4 shows voltage wave forms useful in understanding the present invention.

As the load current increases (i.e., resistor RL decreases), zener CR31 begins to turn OFF, which means less current flows through R31 and thus more voltage is required from R30 to turn ON the transistor T3 of U30. This means transistor T3 remains OFF longer in the cycle and thus less current is pulled from C32 by transistor T3. Thus, the pulse width and the frequency increase as shown in FIG. 4A.

When the output current is at a maximum level, the output voltage drops and does not exceed the sum of the zener CR31 voltage and the diode D3 voltage. Consequently, transistor T3 of U30 is in an OFF condition for its longest time. At this point, the pulse width and frequency of the wave forms of FIG. 4A would be at their maximum rate (not shown).

Figure 4B:
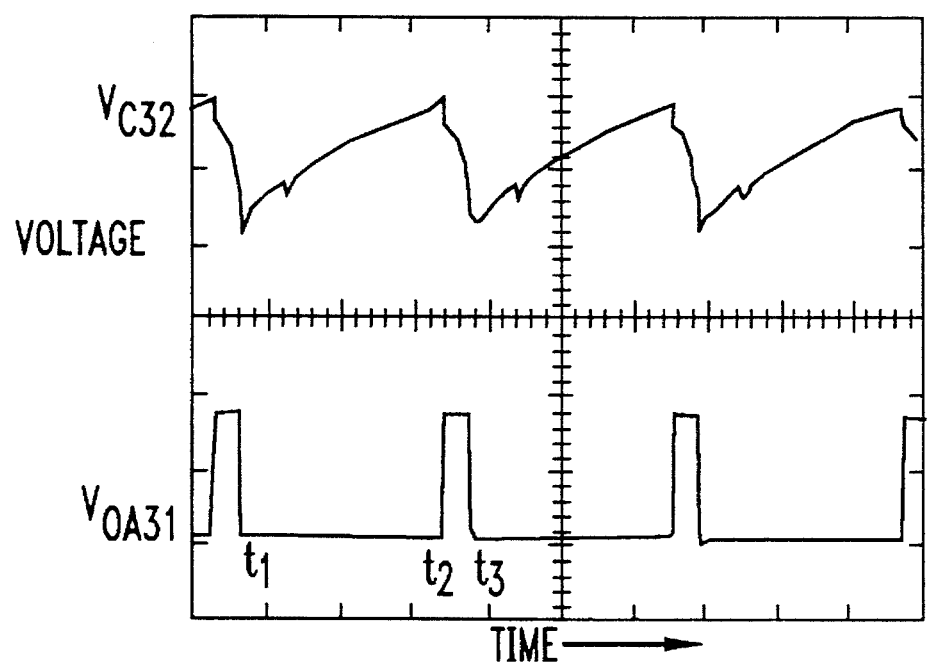

When the load decreases (i.e., resistor RL increases), the output voltage will start to increase. When the output voltage exceeds the sum of the zener CR31 voltage and diode D3 voltage and transistor T3 turns ON, it draws current away from capacitor C32, thereby slowing the frequency of oscillator circuit A30 and decreasing the pulse width of the output wave form. The reduced frequency and pulse width reduces the power provided to the output load RL. Shown in FIG. 4B are the wave forms for a minimum output current (i.e., maximum RL) where, consequently, both the frequency and pulse width are less than those shown in FIG. 4A.

It should be understood that, when primary to secondary voltage isolation is not required, the transformer (T20 of FIG. 2 and T30 of FIG. 3) can be replaced with an inductor, and the rectifier diode (CR20 of FIG. 2 and CR30 of FIG. 3) connects between the inductor and the drain terminal of the FET (F20 of FIG. 2 and F30 of FIG. 3 ). Additionally, it should be understood that a current limiting resistor is typically placed in series with reference diode (CR21 of FIG. 2 and CR31 of FIG. 3) to limit the current flow into the opto-isolator.

What has been described is merely illustrative of the application of the principles of the present invention. Other arrangements and methods can be implemented by those skilled in the an without departing from the spirit and scope of the present invention.

We claim:

1. A switching power supply having its output terminals DC isolated from its input terminals, comprising an oscillator circuit connected to an input terminal of a switching transistor, a zener diode, an opto-isolator device including an input diode optically coupled to a base terminal of an output transistor, the input diode being connected in series with the zener diode across said output terminals, the emitter and collector of the output transistor connected to control the pulse width of said oscillator circuit in response to changes in current through the input dime, and a resistor connected between the base of the output transistor of the opto-isolator device and a source terminal of said switching transistor so as to provide a portion of a current flowing through said switching transistor as a base signal current to the output transistor so as to control a charge time of the oscillator circuit.

2. The switching power supply of claim 1 wherein said oscillator circuit is a Schmitt trigger circuit having a resistor connected in series between its output terminal and input terminal, and a capacitor connected in shunt with the input terminal, a drive circuit is connected to the output terminal of the Schmitt trigger circuit for driving the switching transistor, and wherein said emitter and collector of the output transistor of the opto-isolator device are connected across said capacitor.

3. The switching power supply of claim 2 wherein said output transistor of the opto-isolator device is an NPN transistor with its emitter connected to a negative input terminal of the switching power supply and its collector connected to the input terminal of the Schmitt trigger oscillator circuit.

4. The switching power supply of claim 2 including a transformer having an input winding for receiving an input current from the input terminals and an output winding for outputting a current to a load impedance, said input current being switchably controlled by said oscillator circuit, and wherein the base current of the output transistor of the opto-isolator is derived from both the input current flowing in the input winding and the output current flowing in the output winding.

5. The switching power supply of claim 4 wherein the transformer input winding is connected in series with a resistor, and wherein the base current for the output transistor is obtained by shunting current from said resistor.

6. The switching power supply circuit of claim 2 including an inductor connected between an input terminal and a drain terminal of the switching transistor for outputting a current to a load impedance when said switching transistor is in an OFF state.

* * * * *